Nov. 30, 1926.

E. MARSCHNER

MERCURY ARC RECTIFIER

Filed Oct. 26, 1923

1,608,799

Inventor:
Eugen Marschner
by Meyers and Cavanagh
Attys

Patented Nov. 30, 1926.

1,608,799

UNITED STATES PATENT OFFICE.

EUGEN MARSCHNER, OF WEISSENSEE, NEAR BERLIN, GERMANY.

MERCURY-ARC RECTIFIER.

Application filed October 26, 1923, Serial No. 670,950, and in Germany October 10, 1922.

This invention relates in general to rectifiers and more particularly to mercury arc rectifiers consisting of an evacuated glass vessel or container and electrodes arranged in the glass vessel to which the current is conducted by conductors that pass from the exterior through a metallic leading-in device to the internal electrode.

It has been proposed to make the leading-in devices in the form of copper caps but a serious drawback of copper leading-in devices is that copper amalgamates with, i. e. is attacked by, mercury. Metals which do not amalgamate with mercury cannot be united by fusion with glass so as to form a gas-tight connection unless expensive rare metals such as platinum are used. In accordance with the invention the leading-in device is made of sheet metal consisting of different metal layers. Preferably bi-metal consisting of a layer of iron and a layer of copper or of a layer of nickel and a layer of copper, is employed, the copper layer of the cap contacting with the glass of the vessel and the iron or nickel layer being turned towards the mercury in the rectifier.

Other features of the invention will appear hereinafter in the drawings, specification and claims.

Constructional forms of the invention are illustrated in the drawing in which—

Figure 1:
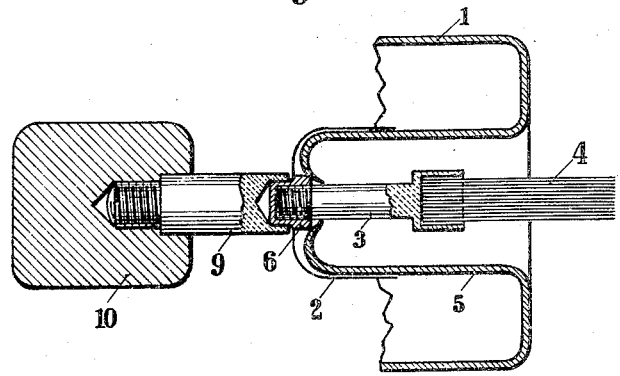
Fig. 1 is a longitudinal section through a part of the glass vessel of a rectifier with which a leading-in device is associated.

The mercury arc rectifier which is partly illustrated in Fig. 1 comprises a glass vessel of which one end 1 only is shown in the drawing. At this end 1 the rectifier is formed with an inwardly projecting hollow neck or cylinder 5 upon whose inner or free end is placed a thin metal cap or cup shaped member 2 consisting of two layers of rolled sheet metal, the layer that contacts with the glass consisting of copper while the outer layer that is exposed to the mercury in the glass vessel consists of iron. 3 is a conductor in the form of a solid rod and 4 a flexible conductor made up of a bundle of thin wires. 9 is an internal conductor and 10 an electrode of the rectifier. To enable the glass neck 5 to be blown into the metallic cap 2 in a simple manner a novel method of manufacture is employed. It is apparent that the external conductors 3 and 4 would make it difficult to blow the glass neck 5 into the metallic cap 2 because the inner end of the glass neck 5 must have a hole or opening through which the conductor 3 passes and it would be difficult to blow the neck 5 into the cap without air escaping between the glass neck and the inner wall of the cap. This difficulty is overcome by soldering a threaded cap 6 into the bi-metal cap 2 and drawing the central part 8 of the glass neck outward in the form of a thin hollow protuberance. The glass neck 5 which has been prepared in this manner is heated and thus softened at its periphery 7 only, then introduced into the cap 2 and blown in by means of a short puff of air. This method of joining the glass neck to the metallic cap enables the latter to be connected to the former without any escape of air. The soft glass is firmly pressed against the cap at all points and a tight joint is thus secured. After the neck 5 and the cap 2 have thus been joined by fusion the thin glass protuberance 8 is punctured and the glass cylinder 5 is broken away from its blowing tube. The tube 5 with its cap 2 is then connected by fusion to the end 1 of the glass vessel and then the external conductor 3 is screwed into the cap 6.

Figure 2:
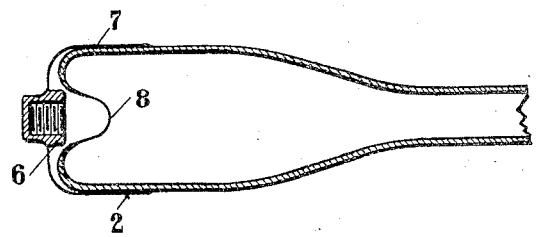
Fig. 2 is a section of a part of Fig. 1 in course of manufacture.
Figure 3:
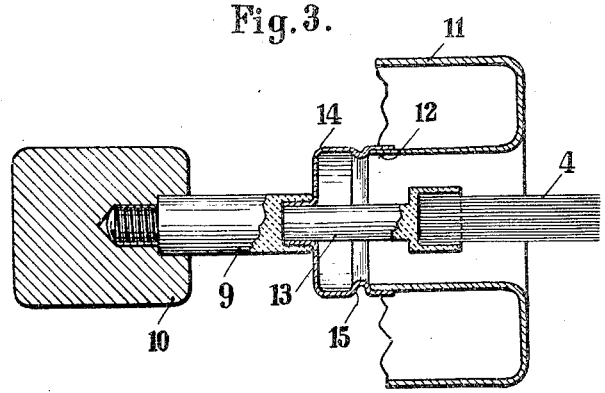
Fig. 3 is a section of a modified leading-in device.

In the modification shown in Fig. 3 the thin bi-metal cap 14 consists of copper and iron. The thickness of the cap is exaggerated in the drawing, the actual thickness being about one tenth of a millimetre. The bi-metal cap is formed with a hollow narrow neck in the middle of its crown and near its outer, wide, open end it has an inwardly projecting annular ridge 15. The external conductor 13 is soldered into the cap 14 and the inner edge 12 of the inwardly extending hollow neck of the glass vessel 11 is pressed firmly against the ridge 15 after the latter has been heated to incandescence. The circular edge 12 of the inwardly extending glass neck is thus caused to melt and to join with the copper. The air which is then blown into the inwardly extending glass neck is prevented from escaping through the joint between the glass and the inner copper surface of the cap 14. In this method of manufacture it is not necessary to provide the inwardly extending glass neck with a thin protuberance like 8 of Fig. 2 and the threaded copper cap 6 for receiving a male thread of the external conductor can be dispensed with. In the two constructional forms shown in Figs. 1 and 3 the internal conductor rod 9 is soldered to the iron or nickel metal layer of the bi-metal cap 2.

The bi-metal sheet of which the cap is made may be produced by rolling the two metals, such as iron and copper, or nickel and copper onto each other or by electro-depositing the one metal upon the other. Instead of nickel or iron any other metal that does not amalgamate with mercury may be employed.

I claim:—

1. In a mercury arc rectifier including a glass vessel having a neck provided with an opening, an electrode in the vessel, and a conductor for the electrode passing through the opening, means to connect the conductor to the neck and to seal the space between them, including a bi-metal substantially cup or cap shaped member engaging the neck, the surface of the member contacting with the neck of a metal fusible with the glass, and the surface adjacent to the electrode of a metal not amalgamating with mercury, said last named metal surface forming a protecting screen between the first named surface and the interior of the vessel.

2. In a mercury arc rectifier, including an evacuated glass vessel having an opening, an electrode in the vessel and a conductor for the electrode passing through the opening, a bi-metal cap closely embracing the electrode at the opening, the metal of the side of the cap that contacts with the glass vessel being of copper, and the other side of the metal cap consisting of iron forming a screen between the copper side and the interior of the vessel.

3. In a mercury arc rectifier including a glass vessel having an opening for a conductor, means to connect the conductor with the glass including a cap having a surface contacting with the glass and of a metal capable of fusion therewith, the remainder of the cap of a metal not amalgamating with mercury, and interposed between the first named metal and the interior of the vessel thereby to screen the same from the action of the mercury.

4. In a mercury arc rectifier, an evacuated glass vessel formed with a hollow neck extending into the vessel, a bi-metal cap formed with a hollow narrow neck in its crown and an inwardly projecting annular ridge near its wide open end, the said ridge abutting upon the free end of the said glass neck and a surface thereof adjacent to the neck being capable of fusion with the glass and united therewith by fusion, an electrode in the evacuated glass vessel, and a conductor passing from the exterior through the cap to the electrode and soldered to the metal cap, the remainder of the cap being of a metal not amalgamating with mercury and interposed between said surface and interior of the vessel to protect said surface from the action of the mercury.

5. In a mercury arc rectifier, a leading in device for the conductor of the internal electrode, comprising a cap having a surface adjacent to the glass fusible therewith and fused thereto, and a surface within the rectifier unaffected by mercury, and interposed between the mercury and the first named surface to screen said surface from the action of the mercury, said cap having means to connect the conductor with the electrode.

In testimony whereof I affix my signature.

EUGEN MARSCHNER.